Figure 5:
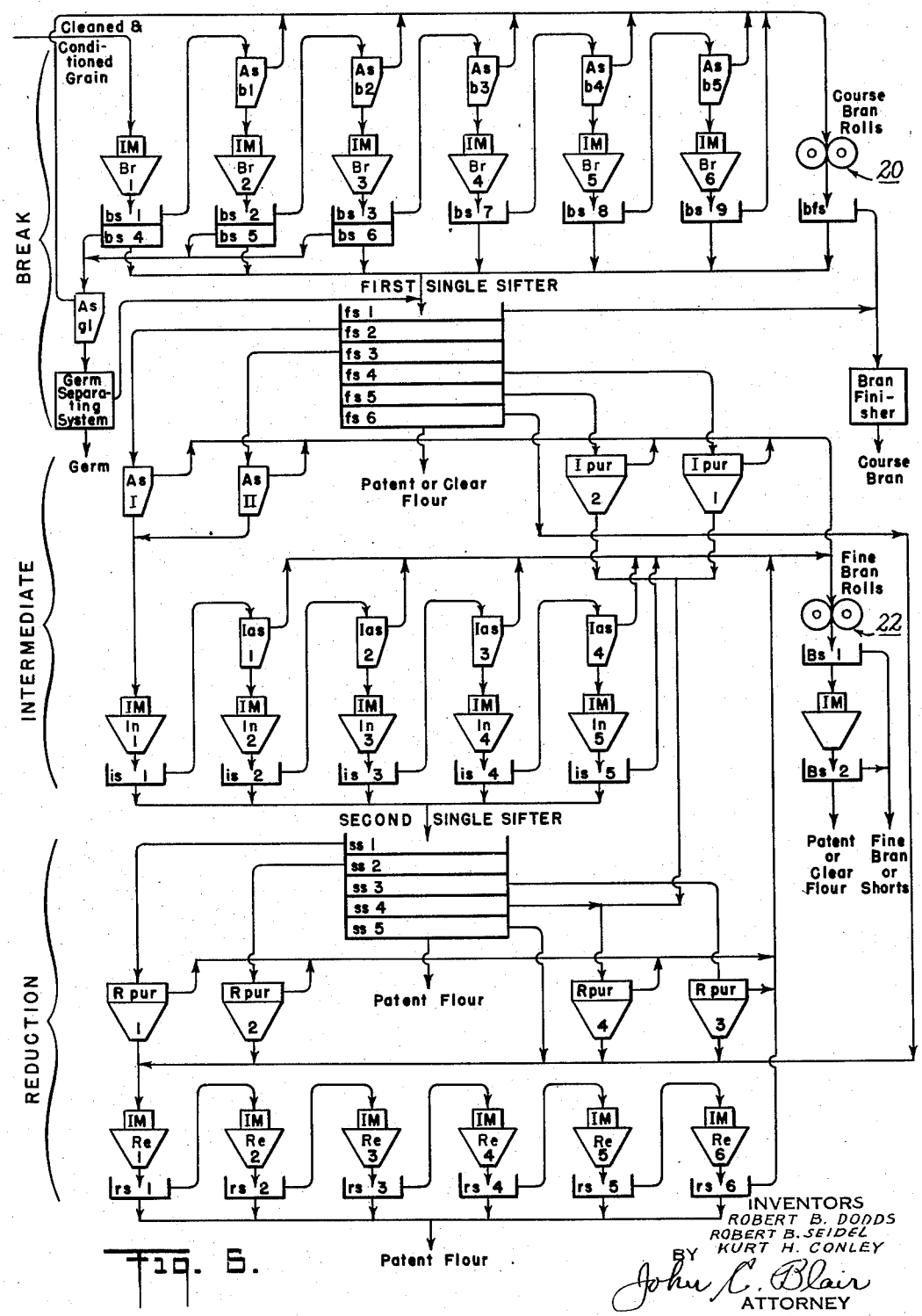

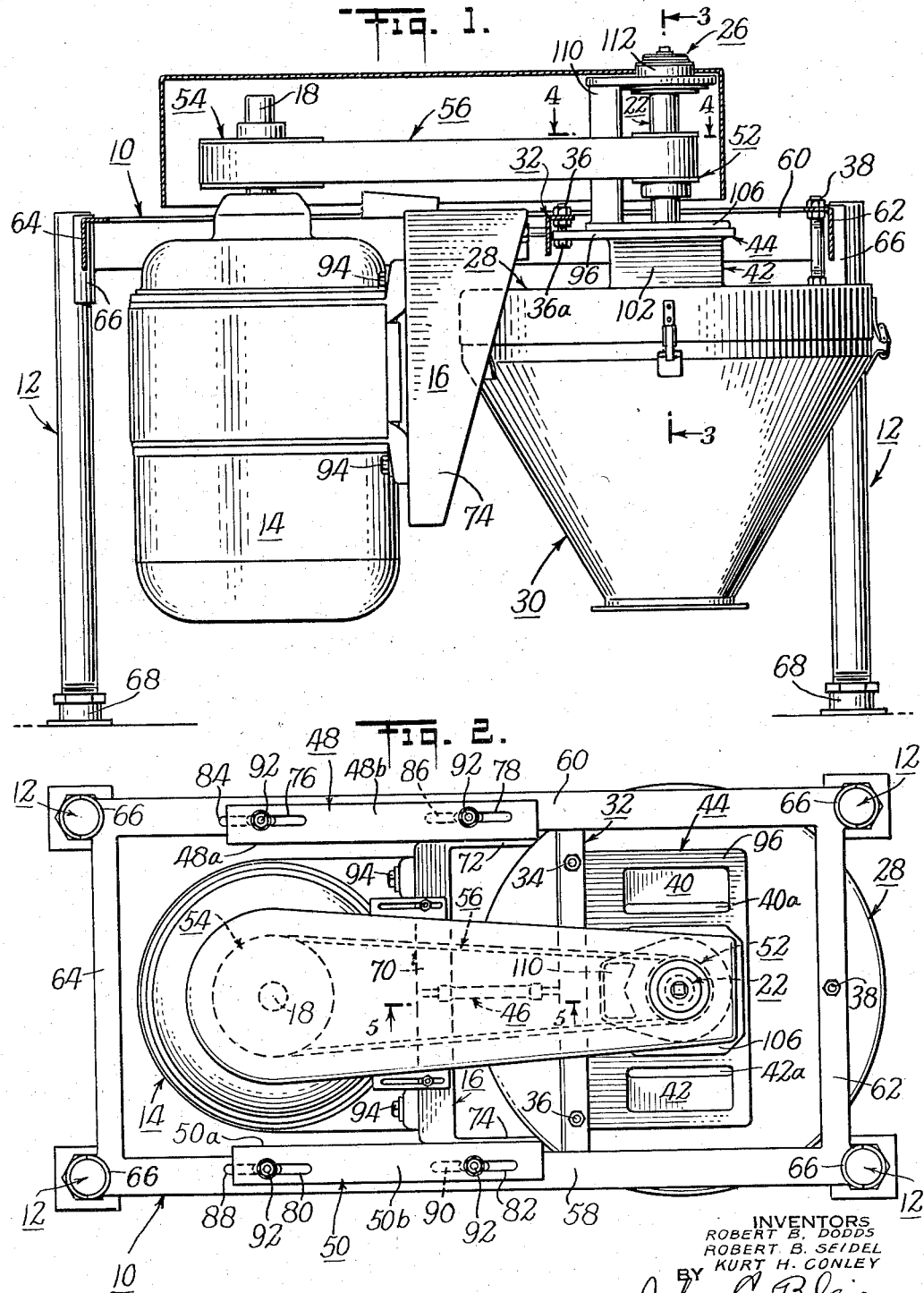

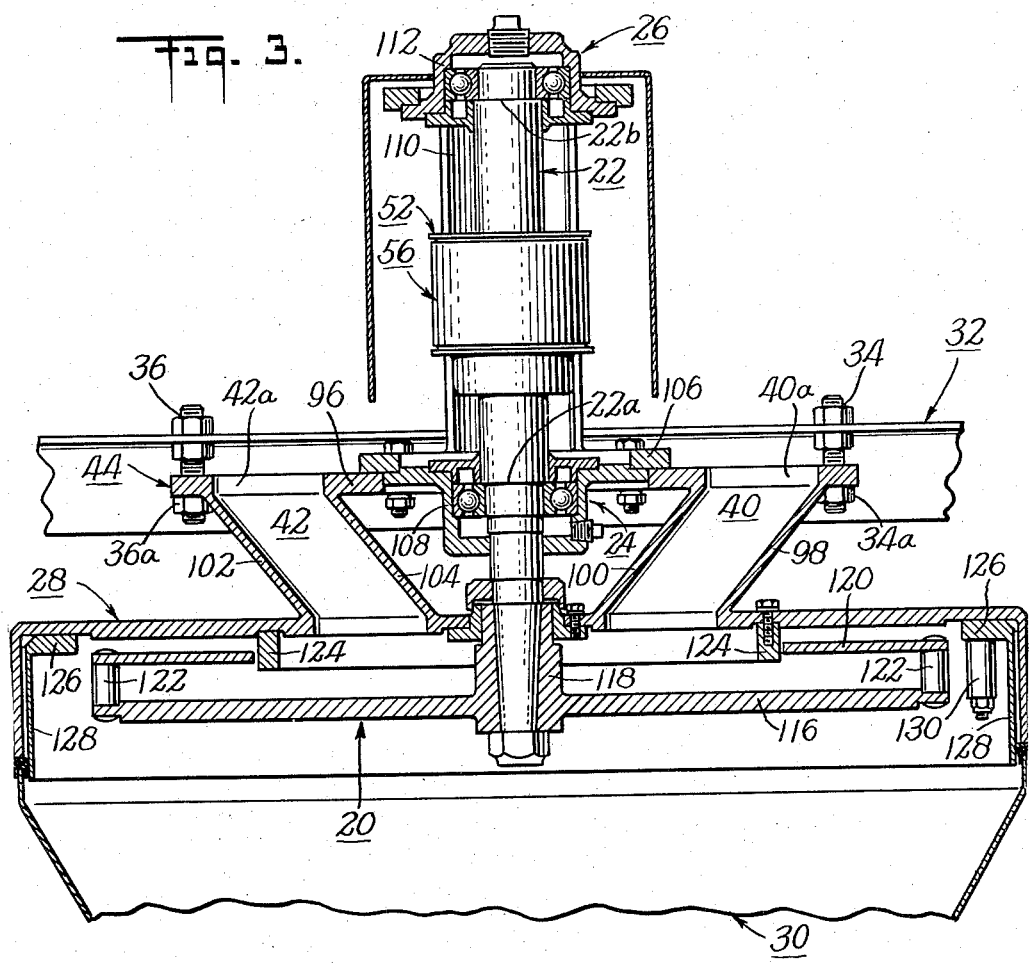

INVENTORS
ROBERT B. DODDS
ROBERT B. SEIDEL
KURT H. CONLEY
BY
John C. Blair
ATTORNEY United States Patent Office 2,879,004
Patented Mar. 24, 1959

2,879,004

CENTRIFUGAL IMPACT MILLING PROCESS OF IMPACT MILLING

Robert B. Dodds, Woodbridge, Kurt H. Conley, Hamden, and Robert B. Seidel, North Haven, Conn., assignors to Safety Industries, Inc., New Haven, Conn., a corporation of Delaware Application December 7, 1954, Serial No. 473,546

22 Claims. (Cl. 241—7)

This invention relates to a process for milling flour from such granular products as wheat, rye, corn, etc. More specifically, it relates to a process particularly useful in the milling of wheat and utilizing centrifugal impact mills, e.g. the mill described herein substantially or completely throughout all milling procedures in place of the usual roller mills. It is here so described with respect to wheat but as presently noted the invention has broader application in milling other materials such as corn, oats and other types of grain commonly milled in various manners.

The milling of flour as presently practiced comprises crushing or otherwise disintegrating the grain being milled by successively passing the grain through pairs of rolls rotated in opposite directions and at different speeds. The rolls at the head end of the mill are referred to as the "break rolls" and usually have corrugated surfaces. Such break rolls are followed by pairs of finishing rolls, usually referred to as "reduction rolls." These are also operated at different speeds with smooth or very finely corrugated surfaces and they act to reduce the product to flour. Of course the milling process includes a series of sifting and separating operations throughout the mill flow designed to remove bran, germ and other undesirable parts of the wheat as well as other impurities.

The disintegration of the grain in the roller mills is accomplished by a shearing action as the grain travels between rolls being oppositely driven at different speeds. Thus the efficiency of the milling operation as practiced in a roller mill is dependent upon the adjustment of these rolls and no matter what this adjustment is the grain varies in size to some extent and passes through the rolls in different axial positions so that disintegrating treatment by the rolls is non-uniform to say the least. This tearing and shearing action of the rolls breaks up a large percentage of germ, bran and other undesirable ingredients and tends to mix such parts of the grain with the endosperm not only contaminating the resulting product but making later separating operations more difficult. Consequently, there should be a number of sifting, purifying and classifying steps throughout the roller milling process between the various sets of rolls in order to effect an efficient milling operation.

In a theoretically perfect milling operation utilizing roller mills, the kernels of grain are supposed to feed through successive pairs of rolls lengthwise or in the direction of their major axis. As will presently be described, the actual operation of the roller mill is far from perfect but individual kernels do follow such general path. Thus after the initial break, when the kernels are supposed to be split along their major axes, the grain proceeds down through the various break and reduction rolls. The rolls are so adjusted that the distance between successive pairs diminishes and each pair is supposed to shave a thin lengthwise layer of endosperm from the split kernel. It is well known that the ash content of the endosperm is much higher in the vicinity of the bran husk. Accordingly as the roller milling process proceeds the ash content of the endosperm rises and for this reason the greatest portion of patent flour comes from endosperm recovered from the earlier break rolls. Not only does this factor complicate the mill flow, but it makes essential careful aspiration and classifying throughout in order to achieve maximum operating efficiency. For these and other reasons the modern roller mill with its complex, expensive and space-consuming equipment not only requires a large initial capital expenditure, but depends principally for success on the skill of those charged with its operation, who must not only be highly trained and competent in this art but must learn the eccentricities of each particular mill. Also, for the reasons mentioned above the mills require a great deal of expensive sifting, separating and purifying machinery all adding to the cost of manufacture, expense of installation and space consumption.

The present invention relates to a milling process in which centrifugal impact machines are used throughout the process in both the break and reduction operations, not to replace or be substituted for rolls in the same position, but to utilize the advantages of impact milling by providing an entirely novel mill flow wherein the action of the impact machines at different points and the results achieved thereby at those points is combined with proper aspirating, purifying and sifting equipment to achieve a maximum of efficiency. For many years, impact milling has been suggested in a variety of forms; in fact the scientific and patent literature in this art is prolix with a variety of such suggestions. Yet despite the many advantages claimed for such systems there has been no significant use of an impacting milling process, particularly where the milling system depends almost entirely upon impact machines to effect desired disintegration of the grain from start to finish.

Perhaps the principal reason for the failure of impact milling in the past has been the tendency to think of the impact machine purely in terms of its ability to disintegrate and therefore to assume that it must be used in a milling process purely as a substitute for rolls. Thus it has often been proposed that impact mills be substituted for rolls at various points in the break and reduction steps leaving the existing sifting, aspirating and purifying equipment to operate pretty much the same as it does in a mill relying on rolls in the same locations. Our experience indicates that this thinking disregards entirely certain fundamental differences which are basic in the operation of impact mills and the results to be acheived thereby as distinguished from such phases of roller mill operation. Impact machines when properly operated break up the kernels along their natural lines of division. Thus as the kernels pass from one impacting machine to another chunks of endosperm are knocked free. In marked contrast to the successive longitudinal layers of endosperm shaved free by the roller mills as described above, these chunks are generally whole or partial cross-sections of the endosperm generally along the minor axes of the kernels. For this reason the quality and particularly the ash content of the endosperm obtained from the various impacting break operations is remarkably constant throughout. Therefore, in contrast to the roller mill, it has been discovered that after germ removal in the first several breaks in a manner to be described the endosperm is substantially uniform in quality and hence can be combined in a single flow, immensely simplifying the classifying and purifying operations.

The principal object of this invention is to provide an impact milling process which is designed to utilize fully the basic advantages of the impact mill and to design the mill flow to achieve maximum advantages from these characteristics. It is another object of this invention to relocate the sifting, aspirating, purifying and classifying apparatus in the interest of efficiency, e.g. by effecting a major simplification of the flow with consequent economies. Yet another object of this invention is to provide an impact milling process wherein the results to be achieved at different points along the flow may be scientifically calculated so that individual adjustments at different points therein are reduced to a minimum thus to eliminate the human element insofar as this is possible. It is a further object of this invention to provide a milling process wherein a better yield and a higher percentage of patent flour are achieved thereby providing a superior product for less cost. A still further object of this invention is to provide a milling process utilizing the disintegrating characteristics peculiar to the impact machine to achieve a higher yield of patent flour at a lower cost. Other objects will be in part obvious and in part pointed out hereinafter.

The invention accordingly comprises the several steps and the relation of one or more of such steps with respect to each of the others, which will be exemplified in the process hereinafter set forth, and the scope of the invention will be indicated in the claims.

For a fuller understanding of the nature and objects of the invention, reference should be had to the following detailed description taken in connection with the accompanying drawings, in which:

Figure 1 is a front elevation, partially broken away, of an impact milling apparatus which may be used advantageously in the impact milling process described herein, Figure 2 is a top plan view of the apparatus shown in Figure 1, Figure 3 is a fragmentary vertical sectional view taken along the line 3—3 of Figure 1, Figure 4 is a fragmentary horizontal sectional view taken along the line 4—4 of Figure 1, Figure 5 is a fragmentary vertical sectional view taken along the line 5—5 of Figure 2 and Figure 6 is a schematic flow diagram of a milling process utilizing impacting mills throughout the flour-producing mill flow and embodying the several features of the invention.

As mentioned heretofore various types of impact mills may be employed in the practice of the method described herein. However excellent results may be obtained with the apparatus now to be described. Very generally this apparatus comprises a substantially rectangular main supporting frame generally indicated at 10 in Figures 1 and 2 supported by legs generally indicated at 12. A motor generally indicated at 14 is suspended from frame 10, being directly secured to a supporting plate generally indicated at 16 depending downwardly from the frame to support the motor drive shaft 18 extending vertically upward therefrom. As best seen in Figure 3, the rotor generally indicated at 20 of the impact mill is mounted on a drive shaft generally indicated at 22 extending vertically upward and rotatably mounted in bearings generally indicated at 24 and 26. Still referring to Figure 3, the rotor 20 extends through a top supporting plate generally indicated at 28, which not only forms a closure for the upper portion of the impact mill, but also has suspended therefrom the casing generally indicated at 30 (Figures 1 and 2); as later described in detail, the rotor 20 and associated driving mechanism is supported on plate 28. As can best be seen in Figure 2 a cross bar generally indicated at 32 is connected to frame 10 and the top supporting plate 28 is suspended from the frame 10 and this cross bar 32 by the stud bolts generally indicated at 34, 36 and 38. Accordingly a three point suspension is provided for plate 28 and the rotor assembly.

Chutes, generally indicated at 40 and 42 (Figure 3) are formed in an upper structure, generally indicated at 44 which is preferably integral with top supporting plate 28, chutes 40 and 42 diverging from the central portion of plate 28 immediately above the corresponding portion of rotor 20. Bearings 24 and 26 are mounted thereabove in a manner to be described in detail later. A turnbuckle generally indicated at 46 (Figures 2 and 5) is connected to crossbar 32 and supporting plate 16. Supporting plate 16 is secured to angle bars generally indicated at 48 and 50 (Figure 2). Thus motor 14 may slide along the frame and be longitudinally adjusted with respect to the impact mill by way of the turnbuckle 46. Shafts 22 and 18 carry pulleys generally indicated at 52 and 54, respectively, interconnected for driving by a belt generally indicated at 56. Accordingly, the rotor may be driven by motor 14 and the axis of shaft 22 may be adjusted in any direction, more specifically, the longitudinal tilt of supporting plate 28 with respect to frame 10 is adjusted by stud bolt 38 and the lateral tilt thereof is similarly adjusted by way of bolts 34 and 36.

Referring now in detail to Figures 1 and 2, frame 10 comprises two longitudinal angle bars 58 and 60 connected at their ends by end crossbars 62 and 64. The corners of frame 10 are connected to semi-cylindrical socket pieces 66, which are bolted or otherwise connected to legs 12 as will be apparent from Figures 1 and 2. Adjustable feet 68 are threaded on the bottoms of the legs so that the apparatus may be levelled despite uneven flooring upon installation.

Still considering Figures 1 and 2, supporting plate 16 for motor 14 comprises a cross single bar 70 spanning angle bars 58 and 60 as can be seen in Figure 2, and connected in turn to a pair of reinforcing plates 72 and 74, connected in turn to vertical portions 48a ad 50a of angle bars 48 and 50. As previously mentioned, the horizontal portions 48b and 50b of angle bars 48 and 50 rest upon frame 10 and, as shown in Figure 2, slots 76, 78, 80 and 82 are formed therein immediately above similarly formed corresponding slots 84, 86, 88 and 90 in angle bars 58 and 60 of the frame 10. Bolts 92 extend through the slots to hold angle bars 48 and 50 and consequently supporting plate 16 in any adjusted position achieved by way of turnbuckle 46. Accordingly, the motor 14, secured to supporting plate 16 by way of bolts 94 (Figures 1 and 2), is rigidly supported from the frame 10 and held in a desired adjusted position with respect to the impact mill in a manner to be more fully described hereinafter.

As best understood from Figures 2 and 3, the upper structure 44 includes an upper plate 96 in which are formed the openings 40a and 42a for the chutes 40 and 42. This plate 96 is substantially rectangular, as viewed from the top in Figure 2, and, being a part of upper structure 44, it is preferably integral with top supporting plate 28 (Figure 3). Accordingly, as seen in Figures 1 and 2, supporting stud bolts 34 and 36 extend through crossbar 32 and are threaded into upper plate 96 with suitable nuts as shown therein to hold the parts locked in the desired adjustment. Thus, for all practical purposes the top supporting plate 28 is supported at three points, via the bolts 34, 36 and 38 (Figure 2), bolts 34 and 36 being connected to upper plate 96 (Figures 1 and 2). Because the upper structure 44 is preferably an integral part of upper plate 28 which in turn supports the entire impact mill apparatus including rotor 20 and associated parts, the whole assembly is supported at three points i.e. laterally by way of bolts 34 and 36 and longitudinally by bolt 38 all as described above.

The chutes 42 and 44 which, as previously noted, diverge from the central portion of the top supporting plate 28 comprise a part of upper structure 44 (Figure 2). More particularly, as viewed in Figure 3, these chutes or passages 40 and 42 comprise pairs of diverging parallel plates, plates 98 and 100 forming chute 40 while plates 102 and 104 respectively form chute 42. Not only are plates 98 and 100 and plates 102 and 104 substantially parallel, but they diverge in corresponding directions, thus to form the passages with the openings 40a and 42a (Figure 2), large enough to be connected to the mill stream wherever it is desired to use this machine.

These plates 98, 100, 102 and 104 are preferably integral with supporting plate 28 and the top of the upper structure 44. Thus the impact mill (Figure 3) with related parts comprises the upper supporting plate 28 with suitable chutes 40 and 42 for entrance of the grain to be milled and an upper plate 96, all of which are integral and provide a firm base for the attachment of both bearings 24 and 26. Accordingly there is assured a firm, but adjustable support for rotor 20 and top supporting plate 28 as well as suitable driving mechanism therefor to be presently described in detail.

As best seen in Figures 2 and 3, a base plate 106 is bolted to upper plate 96 and secured therebelow is a casing 108 for bearing 24 (Figure 3). A post 110 secured to base plate 106 extends upwardly and is connected to a suitable casing 112 for housing the upper bearing 26. Preferably, reduced portions of shaft 22 form shoulders 22a and 22b resting on the bearings 24 and 26 respectively which are preferably thrust bearings as well as rotary, thus to support the shaft 22 in position for rotation and against any axial thrust.

Pulleys 52 and 54 and belt 56 may be of any suitable construction, although it is preferred to use a so-called "timing" belt drive. Accordingly, as seen in Figure 4, pulleys 52 and 54 have teeth 114 shaped to fit corresponding teeth 117 in the belt 56. In this manner there is provided a positive drive connection between the pulleys 52 and 54 combining in itself the important advantages of chain and belt drives and assuring an accurate control of the speed of drive. For further adjustment of the driving speed, it should be understood that mechanism may be interposed between the motor 14 and the shaft 22 of the impact mill to provide for speed adjustment. Such mechanism, for example, can be conveniently suspended from the crossbar 16; this type of apparatus is well-known and is, of course, within the contemplation of the present invention.

Turning to Figure 3, the rotor comprises a bottom circular plate 116 having a hub 118 bolted or otherwise secured to shaft 22. It also includes an upper ring plate 120 and a plurality of impactors 122 evenly spaced about the circumference of plates 116 and 120 and connected therebetween. These impactors 122 may take any convenient shape depending upon the use to which the impact mill is to be put, although in most applications the use of pin-type impactors, substantially round in shape, as shown in Figure 3 is preferred. The surface of plate 116 from the hub 118 to the row of impactors 122 is free from obstruction so that in operation the acceleration of the material moving toward the impactors is unimpeded.

A ring 124 is secured to the underside of top plate 28 and is positioned immediately adjacent the inner edge of ring plate 120 to confine the material being treated. An outer ring 126 is secured to top plate 28 and a liner 128 extends downwardly therefrom below the rotor and thus in the path of material discharged therefrom. Preferably a plurality of circumferentially spaced impacting pins 130 are bolted to and depend downwardly from ring 126 directly in the path of material being discharged by the rotor.

In operation motor 14 operates to drive the rotor 20 at high speed and material to be treated is discharged from chutes 40 and 42 on plate 116 of the rotor adjacent hub 118. As it is impelled outwardly by centrifugal force it spreads out in a thin, substantially even stream over the smooth unobstructed surface of plate 116. Accordingly it accelerates rapidly and in such thin stream hits impactors 122 resulting in substantial breakage of practically all individual particles such as grain. It then shoots outwardly for further severe impacting on pins 130. It is found that the smooth unobstructed space between the hub 118 and impactors 122 together with the concentrically arranged rows of impactors 122 and 126 on the rotor and liner respectively make for a highly efficient impacting action.

With such apparatus mechanism is provided which may be operated at high speeds and at maximum power input. Further, this apparatus is designed for utmost simplicity to insure reliable operation and maximum economies in manufacture. Consequently the machine has great latitude and versatility of application so that it may be utilized in many positions throughout the flow of a milling process such as described herein.

Prior to this impact milling process the grain is thoroughly cleaned to remove all dirt and other extraneous matter such as other grain, seeds, husks, chaff, etc. Preferably in addition to the more conventional cleaning methods the wheat should be subjected to impacting operations in conjunction with aspirators such as those disclosed in Patent Nos. 2,529,679 and 2,645,345 for the purpose of destroying and removing insect infestation and fragments thereof. Additionally the grain is moisture-conditioned prior to milling. Thus, the proper application of steam or water before introducing grain to the system is helpful, and usually the moisture content of the grain so fed to the impact milling process should be approximately 2% higher than similar grain conditioned for a roller mill process. The first temper should be perhaps ½% to 1% above normal, in other words, about 15½% to 16% of water content. Additionally approximately 2% of moisture should be added a few minutes ahead of the process in what might be termed a "second temper," i.e. directly ahead of the break system. This higher moisture content added in the second temper penetrates the bran only and thereby toughens it. This toughening action helps the bran hold together while the endosperm is being knocked away therefrom by the impacting action.

As indicated in the upper left hand corner of Figure 6, the grain, cleaned and conditioned as described above, enters the first centrifugal impact mill BR-1. The impacting action necessary to practice this milling process successfully may be accomplished with a variety of impacting machines. However, the degree of impact to be achieved at various points in the process varies and for this reason the impacting apparatus previously described herein is admirably suited for use in this process. While it is not desired to be so limited, for the purpose of fully describing all important aspects of this invention, rotor speeds of the various impacting machines used throughout the system are suggested and such speeds are those used with an impacting machine such as previously described with respect to Figures 1 to 5 hereof with a rotor having an outside diameter of 27 inches, the distance from its center to the pins being 26¼ inches and there being ¾ of an inch between its periphery and the liner. The speeds referred to herein relate to such an impacting machine.

Returning now to the drawings, the impact mill Br-1 is set to rotate at a relatively low speed, say 1500 r.p.m. The action of this impact mill being relatively light is mainly designed to crack the kernels along lines of natural division while making a minimum of flour. The product then drops down on screen bs-1 the overs thereof being delivered to the first aspirator b-1 located above the centrifugal impact break mill Br-2. After being aspirated therein, it passes through impactor Br-2 thence to the screen bs-2, the overs of which pass to the second aspirator b-2 and thence through impactor Br-3 to the screen bs-3.

In a roller mill system, the breaking rolls are corrugated starting with a coarse corrugation of around 12 to 13 corrugations per inch on the first break, and becoming successively finer in the second, third and fourth breaks. Usually one of the rolls operates about two and a half times the rotating speed of the other, and the corrugations on the rolls are spiralled with respect to the length thereof. Accordingly, the action of a roller mill is designed to break each kernel of wheat as it is locked in the grooves of the slow roll; the faster roll, in theory at least, opens the kernel and rolls it out flat on the roll. The object in all successive break operations in these roll mills is to hold the bran flat against the slow roll and shave out successive thin layers of endosperm with the fast roll. As described above, even assuming a theoretically perfect action, this shaving action becomes closer and closer to the bran with each successive roll break operation raising the ash content of the endosperm so removed as the bran is approached. In practice, however, the bran is laid out flat on the slow roll about half the time for there is nothing to prevent the reverse action, where the endosperm is on the slow roll and the fast roll shaves the bran side. Furthermore, the bran often gets folded leaving bran on both sides, i.e. on the fast roll and the slow roll with the endosperm trapped inside. Despite these shortcomings, which become more pronounced in succeeding break operations, the rolls must be set closer and closer together as the grain proceeds down the flow thus tending to produce more fine particles of bran. It follows that in a roller mill break operation the best stocks are produced from the first few breaks, and the middlings produced in these operations are normally reduced to patent flour. Flour produced from stocks extracted from the later breaks is normally higher in ash with poorer baking qualities, and is thus clear or second grade flour.

In contrast, in the impact break system the stocks produced by each individual break are comparable except that virtually all of the germ is released in whole granular form in the first two or three break operations depending on the degree of impact. It is possible to eliminate practically all germ from the endosperm resulting from these operations; thereafter this endosperm returns to combine with similar, substantially germ-free flows, coming from the later breaks. More specifically, screens $bs-1$, $bs-2$ and $bs-3$ may be on the order of 16 to 18 wire while screens $bs-4$, $bs-5$ and $bs-6$ may be about 30 wire. The throughs of screens $bs-1$, $bs-2$ and $bs-3$ and the overs of screens $bs-4$, $bs-5$ and $bs-6$ are all directed to an aspirator $g-1$ which is adjusted to take off any whole bran coming through to this point. This bran is processed in a manner to be presently described. The middlings and germ leaving aspirator $g-1$ proceed to a suitable germ separating system and the endosperm thus separated from the germ is returned from the germ-separating system to rejoin the main flow from the break system immediately above the First Single Sifter. Germ separation from the endosperm is practically complete at this point and as this separated endosperm returns to join the flow from the later break operations, all material entering the First Single Sifter has substantially the same ash content and flour producing properties.

Returning now to the drawing, the overs of screen $bs-3$ are aspirated in aspirator $b-3$, thence passed through impact mill $Br-4$ to screen $bs-7$ and the stream continues in this manner. Thus the overs of screen $bs-7$ go through aspirator $b-4$, impact mill $Br-5$, to screen $bs-8$, the overs of which go to aspirator $b-5$ and through impact mill $Br-6$ to screen $bs-9$. Screens $bs-7$, $bs-8$ and $bs-9$ are preferably in the neighborhood of 20 wire, and as seen in the drawing, the throughs from these screens join the throughs from screens $bs-4$, $bs-5$ and $bs-6$ above the First Single Sifter in a manner to be presently described. As previously noted the milling process is not to be limited to any particular impact mill but where using a mill of the construction and dimensions disclosed herein favorable results may be achieved with the following speeds: Impact mill $Br-2$, 1750 r.p.m.; impact mill $Br-3$, 2000 r.p.m.; impact mill $Br-4$, 2150 r.p.m.; impact mill $Br-5$, 2300 r.p.m.; impact mill $Br-6$, 2500 r.p.m. The extraction from each of these breaks, i.e. impact mills $Br-1$, $Br-2$, $Br-3$, $Br-4$, $Br-5$ and $Br-6$, is the same for all practical purposes except for the germs in breaks 1, 2 and 3. Indeed it is surprising to find how uniform in flour producing characteristics these various breaks are for this is the antithesis of what transpires in a roller mill system where, particularly in the break operation, the product is non-uniform in flour producing characteristics requiring very careful screening, aspirating, purifying, etc. Thus in this impact milling system the screening and like operations are very materially simplified in a manner to be presently described.

In addition to the uniformity of the product, leaving the various break operations, the bran particles are knocked free in relatively large pieces which may be readily removed during the break operations by aspiration as has just been described. This aspiration is, of course, very light and is carefully designed to remove the clean bran only; and it has been found that by using aspirators as shown here in a six break system, 7 to 8% or about one half of the total bran is removed in perfectly clean condition. This is in marked contrast to the roller milling process where the scraping, shaving and tearing action of the rolls tends to break the bran into small particles thus making separating operation by way of purifiers and other complex and expensive machinery much more difficult. It goes without saying that the sooner the bran is removed, the better in any milling system, for the more the bran is handled in the system, the more likely it is to break into small particles, difficult to remove, thereby producing a high ash stock in the flour streams.

The overs from the scalping screen $bs-9$ following the last impact break in impact mill $Br-6$ may possibly contain a small amount of bran with pieces of endosperm attached thereto. Further a small percentage of bran particles separated by the aspirators $b-1$, $b-2$, $b-3$, $b-4$ and $b-5$ may also contain pieces of endosperm. Usually it is more efficient to direct this material from the aspirators and the overs from screen $bs-9$ through bran rolls 20 which are preferably smooth or finely corrugated to knock loose these additional pieces of endosperm. The stock then continues to the screen $bfs$, the throughs from which may join the main stream of throughs from the various impact breaks to the First Single Sifter. The overs from screen $bfs$ go to some type of bran duster or bran finisher and thence to bran feed.

It is to be noted that it is found preferable to use aspiration after each impact break thus the five aspirators, $b-1$, $b-2$, $b-3$, $b-4$ and $b-5$ comprise as a whole an unusually large amount of aspiration in this portion of the milling process. As noted above, this is possible because such a large amount of bran is knocked clean from the endosperm and hence may be separated from the stock by aspiration. However, the use of so many aspirators has the disadvantage of drying out the stocks, but this may be nicely controlled by adding humid air, preferably at each aspiration. In fact, the addition of humid air into the system by way of these aspirators as the stock progresses through the break system is a convenient method of controlling humidity conditions, i.e. moisture content of stocks throughout the break operation.

As shown in the drawings because of the uniformity of the product coming from the various break operations, the throughs from the screens $bs-4$, $bs-5$, $bs-6$, $bs-7$, $bs-8$, $bs-9$ and $bfs$ join to pass through the Single Sifter. This sifter is of standard construction and may comprise individual screens $fs-1$, $fs-2$, $fs-3$, $fs-4$, $fs-5$ and $fs-6$. The size of these screens may vary according to the character of the preceding break operations and the methods, steps and equipment, e.g. the type of separating equipment, the sizes and speeds of impact mills to be employed, and indeed a variety of factors. By way of illustration, these screens may be in the neighborhood of the following dimensions: for $fs-1$, 16 wire; for $fs-2$, 30 wire; for $fs-3$, 60 wire; for $fs-4$, 72 wire, for $fs-5$, 8xx; and $fs-6$, 12xx. The amount of break flour produced in impact milling such as here described is substantially less and usually on the order of one half of that produced in the normal roller mill system, but its ash content may be somewhat higher. Accordingly, all of the flour passing through the First Single Sifter from the break systems, i.e. through the screen $fs$-6 may be clear flour but this is a small fraction of the total yield in the system. As previously noted, the endosperm produced in the break system, usually termed "middlings," is the result of breaking the wheat kernel along its natural lines of division or the lines of least resistance and these particles are uniformly shaped and generally coarser than is true in a roller break system. Consequently the endosperm particles in the stock passing through a screen of about 30 wire, such as screen $fs$-2, are still denser than the accompanying bran particles and hence the bran may be removed most economically by aspiration. The remainder of the endosperm particles comprising the throughs of screen $fs$-3 are so fine that the bran particles cannot be economically removed by aspiration; consequently these stocks are sent to purifiers before reduction to flour. More particularly the throughs of purifiers $Ipur$ 1 and 2 go to purifier $Rpur$ 4 for further purification and thence into the reduction system.

The coarser middling stocks over wires $fs$-2 and $fs$-3 are invariably a mixture of some clean pieces of endosperm and many have a piece of bran attached. They could be sized or dressed by means of corrugated roller mills but the advantages of impact still apply. Thus these particles are subjected to successive impact operations of sufficient intensity to knock loose the pieces of clean bran from the endosperm and make a further separation of the bran before the endosperm is subjected to higher, harder impact for reduction to flour. These impact operations here termed the Intermediate Break System, are carried on at greater speeds to thereby impart greater impact to the stock because the individual particles of endosperm are smaller in mass than in the break operations, thus requiring greater force for knocking the bran loose.

More particularly, the overs of screen $fs$-1 are for the most part bran containing very little if any endosperm and so they may go directly to the Bran Finisher as shown in the drawing. The overs of screen $fs$-2 are preferably aspirated to remove the bran particles therein and hence they go to $As$-I. This is also true of the overs from screen $fs$-3 which are preferably directed to a second aspirator $As$-II. As previously noted, the overs from the screens $fs$-4 and $fs$-5 contain bran particles too small for effective removal by aspiration and hence they go to purifiers $Ipur$ 1 and $Ipur$ 2, respectively thereafter bypassing the Intermediate Break System. It is possible to use other types of separating equipment at this point but it is economical to use the aspirator on the large stocks headed for the Intermediate Break System where bran removal is easier. On the other hand the purifier is felt to have certain advantages for the smaller stocks in that it is wholly reliable in separating out undesirable portions such as small bran particles, etc. Other types of separating equipment might be used at this point with facility, the object being an efficient classification or separation before the intermediate break and reduction operations.

The number of impact operations in Intermediate Break System may vary according to the requirements of the particular system involved. Experience indicates, however, that five impact mills operating at speed in the neighborhood of 2000 to 2500 r.p.m. work very well, although a smaller number driven at higher speeds to induce greater impact may well prove quite satisfactory. However, it is preferable to have several impact operations at lower speeds to avoid the endency to pulverize the bran attached to the endosperm particles and also to make as little flour as possible until all of the bran is separated from the endosperm.

Referring now to the drawing in detail, as previously mentioned, the overs from the screen $fs$-2 go to the aspirator $As$-I and the throughs from the aspirator go to the first impact mill $In$-1. The overs from the screen $fs$-3 go to the second aspirator $As$-II and its throughs join the throughs from the aspirator $As$-I to the first impact mill $In$-1 in the Intermediate Break System. The throughs from the impact mill $In$-1 go to screen $is$-1, the overs from which then pass to the first intermediate aspirator $Ias$-1. Again any type of bran separating system may be used here although we have found from experience that an aspirator is probably best suited to separate out bran and other impurities which have been knocked loose from the endosperm in this first intermediate impact. From the aspirator $Ias$-1 the throughs pass to impact mill $In$-2, thence to a screen $is$-2 and the flow continues as follows: the overs from screen $is$-2 pass to aspirator $Ias$-2 and thence to intermediate impact mill $In$-3; the overs from screen $is$-3 pass to aspirator $Ias$-3 and thence to intermediate impact mill $In$-4; the overs from the screen $is$-4 pass to an aspirator $Ias$-4, the throughs from which go to the last intermediate impact mill $In$-5; the overs from screen $is$-5 join the overs from aspirators $Ias$-1, $Ias$-2, $Ias$-3 and $Ias$-4 to bran rolls 22. These bran rolls 22 are preferably substantially similar in construction and operation to bran rolls 20, previously described, although their surfaces may be smooth, or substantially so, and they remove practically all of the endosperm from remaining bran particles; the stock then goes to bran screen $Bs$-1, the overs from which go to feed. The throughs from screen $Bs$-1 go to a final impact mill to be sure that no good stock is lost to feed. Finally, the stock passes to a screen $bs$-2, the overs from which go to fine bran or shorts, while the throughs comprise are clear flour.

The same uniform quality of product found in the Break System previously described prevails in this Intermediate Break System, i.e. the endosperm particles are chunks of various sizes with very little bran in small or powdery form. Consequently the ash content is very low and the throughs from screens $is$-1, $is$-2, $is$-3, $is$-4 and $is$-5 may be successfully joined above the Second Single Sifter comprising a series of individual screens $ss$-1, $ss$-2, $ss$-3, $ss$-4 and $ss$-5. While the size of these screens may vary according to the particular system and the particular products, it is suggested that they be in the neighborhood of the following dimensions: for $ss$-1, 30 wire; for $ss$-2, 50 wire; for $ss$-3, 72 wire; for $ss$-4, 92 wire; for $ss$-5, 12xx. The throughs from this Second Single Sifter are patent flour and in actual practice, this flour is found to be of very high quality and low ash content. The overs from these screens preferably go to purifiers for removal of bran or other impurities which at this stage are so small in size that they cannot be removed practically by aspiration. Of course, various types of equipment may be used to remove these impurities from the flour at this time, but in most instances standard purifiers have been found to be satisfactory. Accordingly, the overs from screen $ss$-1 go to purifier $Rpur$-1; the overs from screen $ss$-2 go to purifier $Rpur$-2; the overs from screen $ss$-3 go to purifier $Rpur$-3; and the overs from screen $ss$-4 go to the purifier $Rpur$-4. The overs from the screen $ss$-5 join the throughs from all of the purifiers $Rpur$-1, 2, 3 and 4 and this flow goes to the first impact reduction mill $Re$-1.

Different numbers of the reduction impact mills may be used although it has been found convenient to use six of the size and construction previously described and at speeds approximating 3500 r.p.m.; the screens $rs$-1 through $rs$-6 used here are preferably made from flour silk, about 12xx. Accordingly, the flow passes from impact reduction mill $Re$-1 to screen $rs$-1, the overs from which go to the second impact reduction mill Re-2. Thus, as indicated in the drawing, the reduction flow continues as follows: the overs from screen rs-2 go through impact reduction mill Re-3 to screen rs-3; the overs from screen rs-3 go to impact reduction mill Re-4 and to screen rs-4; the overs from screen rs-4 go to impact reduction mill Re-5 and to screen rs-5 and the overs of screen rs-5 go to impact reduction mill Re-6 and thence to screen rs-6. The overs of screen rs-6, very small in quantity, are passed through suitable rolls, an impact mill and a screen substantially similar to rolls 22 and associated parts to extract therefrom the remainder of flour, clear or patent, according to operating results. In any case the great majority of the product from the reduction system goes through one of the screens rs-1 to rs-6, all of which material is patent flour of high quality. Air classifying equipment may be substituted for screens rs-1 to rs-6 with equal and sometimes superior results.

This milling process wherein centrifugal impact mills are utilized throughout to disintegrate the wheat results in many advantages not previously possible of achievement in impact mills of any type. A much higher percentage of patent flour can be produced by this milling system and the yield is far superior to a comparable roller mill, that is to say more yield per unit of wheat is made possible. The necessary equipment for carrying out this milling process is considerably less expensive not only in cost per unit, but because far less apparatus is necessary. Power consumption is much lower as is maintenance and mill space and necessary machinery is much lighter which greatly reduces the floor load in a mill. Present mills utilizing rolls take up a very large amount of space in order to achieve proper milling and this not only involves a large initial capital expenditure but it also creates many problems of conveying the stream to different floors of the mill, etc. Because there are fewer adjustments to be made in apparatus forming this milling system, it is not apt to be thrown out of adjustment or made inefficient by the human element. Because the flow is so simple, problems of conveying streams are materially reduced, and in fact this system lends itself ideally to pneumatic conveying. The impact mills themselves creates considerable positive pressure throughout the system and additional air can be blown into the system when desired without harming the various operations; in fact, it is within the contemplation of this invention to provide pneumatic conveying throughout the system and this would also be helpful in controlling humidity conditions throughout. Further, it is to be noted that the same mill may be used for either soft or hard wheat or for combinations of the two. The only important change which might be desirable in converting from say hard wheat to soft wheat might be in the flour sifting equipment which would run somewhat finer in the case of soft wheat. Also it is simple matter to provide one or two extra impact mills in each milling stage, i.e. break, intermediate and reduction. These impact mills perhaps running at higher speeds can be cut in or out of the system by simple adjustments and when so provided they give the miller additional latitude to make up for variations in stock, operating conditions, etc. Also, in the reduction stage, these extra machines may be used to achieve a finer, more uniform particle size in the patent flour without serious damage to the starch cells.

It will thus be seen that the objects set forth above, among those made apparent from the preceding description, are efficiently attained and, since certain changes may be made in carrying out the above process without departing from the scope of the invention, it is intended that all matter contained in the above description or shown in the accompanying drawings shall be interpreted as illustrative and not in a limiting sense.

We claim:

1. In a process for centrifugally milling grain to flour, the steps comprising centrifugally impacting a free-flowing stream of grain by a series of break-impact operations, separating the germ from the throughs of the first several break-impact operations, separating the bran particles adhering to the free chunks of endosperm during said break-impact operations, rolling said bran particles, separating the bran from the batch resulting from said rolling step, combining the throughs from all of said impact operations, into one batch, classifying said batch into a break-coarse batch and a break-fine batch, centrifugally impacting said break-coarse batch coming from said classification step by a series of intermediate-break operations, classifying the material from said intermediate-break operations into an intermediate-coarse batch and an intermediate-fine batch, combining said intermediate-fine batch and said break-fine batch into a pre-reduction batch, centrifugally impacting said pre-reduction batch in a series of reducing-impact operations, and sifting the stock between each of said reducing-impact operations to obtain patent flour.

2. In a process for centrifugally milling grain to flour, the steps comprising centrifugally impacting a free-flowing stream of grain by a series of break-impact operations, separating the bran particles adhering to the free chunks of endosperm during said break-impact operations, rolling said bran particles, separating the bran from the batch resulting from said rolling step, combining the throughs from all of said impact operations into one batch, classifying said batch into a break-coarse batch and a break-fine batch, centrifugally impacting said break-coarse batch coming from said classification step by a series of intermediate-break operations, classifying the material from said intermediate-break operations into an intermediate-coarse batch and an intermediate-fine batch, combining said intermediate-fine batch and said break-fine batch into a pre-reduction batch, centrifugally impacting said pre-reduction batch in a series of reducing-impact operations, and sifting the stock between each of said reducing-impact operations to obtain patent flour.

3. In a process for centrifugally milling grain to flour, the steps comprising centrifugally impacting a free-flowing stream of grain by a series of break-impact operations, separating the bran particles adhering to the free chunks of endosperm during said break-impact operations, rolling said bran particles, separating the bran from the batch resulting from said rolling step, combining the throughs from all of said impact operations into one batch, classifying said batch through a substantially 60 wire screen into a break-coarse batch and a break-fine batch, centrifugally impacting said break-coarse batch coming from said classification step by a series of intermediate-break operations, classifying the material from said intermediate-break operations into an intermediate-coarse batch and an intermediate-fine batch, combining said intermediate-fine batch and said break-fine batch into a pre-reduction batch, centrifugally impacting said pre-reduction batch in a series of reducing-impact operations, and sifting the stock between each of said reducing-impact operations to obtain patent flour.

4. The series of steps defined in claim 3 and additionally removing bran and adhering endosperm from the stock during the intermediate-break operations.

5. The series of steps defined in claim 3 and additionally aspirating the overs from said 60 wire screen to remove bran and other foreign material therefrom.

6. The series of steps defined in claim 3 in which a major portion of the throughs from said 60 wire screen are purified prior to being combined with the throughs from said intermediate-break operation.

7. In a process for centrifugally milling wheat or like grain to flour, the steps comprising centrifugally impacting a free-flowing stream of grain by a series of break-impact operations, separating bran and other extraneous material from the flour and endosperm, centrifugally impacting all endosperm above flour particle size in a series of intermediate operations in an intermediate batch, separating bran and other extraneous material from said intermediate batch, and centrifugally impacting what remains of said intermediate batch at higher speeds than in intermediate operations to achieve a finer particle size in the resultant flour and a higher yield of patent flour.

8. In a process for centrifugally milling grain to flour, the steps comprising centrifugally impacting a free-flowing stream of grain by a series of break-impact operations, separating the bran particles adhering to the free chunks of endosperm during said break-impact operations, rolling said bran particles, separating the bran from the batch resulting from said rolling step, combining the throughs from all of said impact operations into one batch, classifying said batch through a substantially 60-wire screen into a break-coarse batch and a break-fine batch, aspirating said break-coarse batch, centrifugally impacting said break-coarse batch coming from said classification step by a series of intermediate-break operations, classifying the material from said intermediate-break operations into an intermediate-coarse batch and an intermediate-fine batch, combining said intermediate-fine batch and said break-fine batch into a pre-reduction batch, separating substantially all of the remaining bran from said last-mentioned batch, centrifugally impacting said pre-reduction batch in a series of reducing-impact operations, and sifting the stock between each of said reducing-impact operations to obtain patent flour.

9. The series of steps defined in claim 8 and additionally the step of tempering the grain in advance of the process to raise and control the moisture content thereof.

10. In a process for centrifugally milling grain to flour, the steps comprising centrifugally impacting a free-flowing stream of grain by a series of break-impact operations, separating the endosperm from bran particles adhering thereto during said break-impact operations, combining the throughs from all of said impact operations into one batch, classifying said batch into a break-coarse batch and a break-fine batch, centrifugally impacting said break-coarse batch coming from said classifying step in an intermediate-break operation to produce an intermediate batch, combining said intermediate batch and said break-fine batch into a pre-reduction batch, centrifugally impacting said pre-reduction batch in a series of reducing-impact operations, and classifying the stock between each of said reducing-impact operations to obtain patent flour.

11. The several steps defined in claim 10 in which the separating of the material during said break-impact operations is accomplished through 16 wire or finer.

12. The series of steps defined in claim 10 in which the stock is aspirated after each intermediate-break operation.

13. The several steps defined in claim 10 wherein bran and other foreign material is removed from said break-coarse batch prior to said intermediate-break operations.

14. The several steps defined in claim 10 wherein said break-fine batch is purified prior to combining with said intermediate-fine batch.

15. The several steps defined in claim 10 wherein bran and other foreign material are removed from said intermediate-coarse batch and the batch thus purified is then combined with said pre-reduction batch for said reducing-impact operations.

16. In a process for centrifugally milling grain to flour, the steps comprising centrifugally impacting a free-flowing stream of grain by a series of break-impact operations, separating the endosperm from bran particles adhering thereto during said break-impact operations, combining the throughs from all of said impact operations into one batch, classifying said batch into a break-coarse batch and a break-fine batch, centrifugally impacting said break-coarse batch coming from said classifying step in an intermediate-break operation, classifying the material from said intermediate-break operation into an intermediate-coarse batch and an intermediate-fine batch, separately purifying said intermediate-coarse batch and said intermediate-fine batch and combining said batches into a pre-reduction batch, centrifugally impacting said pre-reduction batch in a series of reducing-impact operations, and classifying the stock between each of said reducing-impact operations to obtain patent flour.

17. The combination and steps defined in claim 16 which includes the step of separating the germ from the throughs of the first several break-impact operations.

18. In a process for centrifugally milling grain to flour, the steps comprising centrifugally impacting a free-flowing stream of grain by a series of break-impact operations, separating the endosperm from bran particles adhering thereto during said break-impact operations, combining the throughs from all of said impact operations into one batch, classifying said batch into a break-coarse batch and break-fine batch, centrifugally impacting said break-coarse batch coming from said classifying step in an intermediate-break operation to produce an intermediate batch, combining said intermediate batch and said break-fine batch into a pre-reduction batch, centrifugally impacting said pre-reduction batch in a series of reducing-impact operations, and classifying the stock, leaving said reducing-impact operations to obtain patent flour.

19. In a process for centrifugally milling grain to flour, the steps comprising centrifugally impacting a free-flowing stream of grain by a series of break-impact operations, separating the endosperm from bran particles adhering thereto during said break-impact operations, combining the throughs from all of said impact operations into one batch, classifying said batch into a break-coarse batch and a break-fine batch, centrifugally impacting said break-coarse batch coming from said classifying step in an intermediate-break operation, classifying the material from said intermediate-break operation into an intermediate-coarse batch and an intermediate-fine batch, purifying said intermediate-fine batch and said intermediate-coarse batch, combining the throughs from such purifying step into a pre-reduction batch, adding said break-fine batch to said pre-reduction batch, centrifugally impacting said pre-reduction batch in a series of reducing-impact operations, and classifying the stock coming from said reducing-impact operations to obtain patent flour.

20. In a process for centrifugally milling grain to flour, the steps comprising centrifugally impacting a free-flowing stream of grain by a series of break-impact operations, separating the bran particles from the free chunks of endosperm during said break-impact operations, combining the throughs from all of said impact operations, classifying said throughs into a break-coarse batch and a break-fine batch, centrifugally impacting said break-coarse batch by a series of intermediate-break operations, separating bran particles adhering to the endosperm in the material leaving said intermediate-break operations, combining the remaining endosperm into a pre-reduction batch, adding said break-fine batch to said pre-reduction batch, and reducing said combination to patent flour by a series of reducing and separating steps.

21. The combination defined in claim 20 in which the germ is separated from the throughs of the first several break-impact operations.

22. In a process for centrifugally milling grain, the steps comprising disintegrating the individual particles of a free-flowing stream of starch-bearing grain, separating the germ from such starch-bearing material, separating free endosperm from such starch-bearing material after such germ separation, centrifugally impacting the remaining material which largely comprises fiber with endosperm adhering thereto in an intermediate-batch operation to produce an intermediate batch, separating free endosperm from said intermediate batch, centrifugally the remainder of said intermediate batch which largely comprises fiber with endosperm adhering thereto, said separating free endosperm from the fiber in the material leaving said last-mentioned impacting step, whereby the majority of the free endosperm is separated and freed from the fibrous material of the grain.

References Cited in the file of this patent

UNITED STATES PATENTS

| | | |
|---|---|---|
| 249,725 | Harmon | Nov. 15, 1881 |
| 254,012 | Holt | Feb. 21, 1882 |
| 307,386 | Gillen | Oct. 28, 1884 |
| 310,709 | Nagel et al. | Jan. 13, 1885 |
| 344,246 | Case | June 22, 1886 |
| 1,784,762 | Smith | Dec. 9, 1930 |
| 1,950,501 | MacKay | Mar. 13, 1934 |
| 2,392,365 | Carter | Jan. 8, 1946 |
| 2,464,212 | Carter et al. | Mar. 15, 1949 |
| 2,529,679 | Dodds | Nov. 14, 1950 |
| 2,582,509 | Smith | Jan. 15, 1952 |
| 2,656,988 | Smith | Oct. 27, 1953 |

OTHER REFERENCES

Practical Milling, by B. W. Dedrick, 1924, Scientific Library Designation TS 2145 D4, pages 197–200.

Flour Milling, by J. F. Lockwood, 1948, Scientific Library Designation TS 2145 L6, page 413.

UNITED STATES PATENT OFFICE

CERTIFICATE OF CORRECTION

Patent No. 2,879,004 March 24, 1959

Robert B. Dodds et al.

It is hereby certified that error appears in the printed specification of the above numbered patent requiring correction and that the said Letters Patent should read as corrected below.

Column 4, line 30, for "ad" read -- and --;  column 9, line 72, for "endency" read -- tendency --;  column 11, line 43, for "creates" read -- create --;  column 14, line 73, before "the remainder" insert -- impacting --;  line 75, for "said" read -- and --.

Signed and sealed this 28th day of July 1959.

(SEAL)
Attest:

KARL H. AXLINE
Attesting Officer

ROBERT C. WATSON
Commissioner of Patents